(12) United States Patent
Dicker et al.

(10) Patent No.: US 6,272,353 B1
(45) Date of Patent: *Aug. 7, 2001

(54) METHOD AND SYSTEM FOR MOBILE COMMUNICATIONS

(75) Inventors: Olaf Dicker, Austin; Uwe Sydon, Round Rock; Juergen Kockmann, Austin, all of TX (US)

(73) Assignee: Siemens Information and Communication Mobile LLC., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,168

(22) Filed: Aug. 20, 1999

(51) Int. Cl.$^7$ ............................... H04B 7/00; H04Q 7/20
(52) U.S. Cl. ............................ 455/517; 455/62; 455/63; 455/423; 375/132; 375/224; 375/225
(58) Field of Search ................................ 455/63, 62, 423, 455/454, 424, 67.3, 69, 517; 375/132, 224, 133, 225; 370/343, 332

(56) References Cited

U.S. PATENT DOCUMENTS

| | | | |
|---|---|---|---|
| 3,681,694 | 8/1972 | Sarati | 325/2 |
| 4,736,453 | * 4/1988 | Schloemer | 455/33 |
| 5,044,010 | 8/1991 | Frenkiel et al. | 379/61 |
| 5,138,616 | 8/1992 | Wagner et al. | 371/5.1 |
| 5,148,548 | 9/1992 | Meche et al. | 455/34.1 |
| 5,197,093 | 3/1993 | Knuth et al. | 379/61 |
| 5,323,447 | 6/1994 | Gillis et al. | 379/61 |
| 5,412,658 | * 5/1995 | Arnold et al. | 370/69.1 |
| 5,471,650 | 11/1995 | Vexler et al. | 455/69 |
| 5,475,868 | 12/1995 | Duque-Anton et al. | 455/62 |
| 5,541,954 | 7/1996 | Emi | 375/202 |
| 5,581,555 | 12/1996 | Dubberly et al. | 370/487 |
| 5,671,219 | * 9/1997 | Jensen et al. | 370/280 |
| 5,708,973 | 1/1998 | Ritter | 455/62 |
| 5,737,359 | 4/1998 | Koivu | 375/202 |
| 5,761,621 | * 6/1998 | Sainton | 455/453 |
| 5,793,795 | 8/1998 | Li | 375/200 |

(List continued on next page.)

FOREIGN PATENT DOCUMENTS

| | | | |
|---|---|---|---|
| 2 261 141 A | 5/1993 | (GB) | H04K/1/00 |
| 2 340695 A | 2/2000 | (GB) | H04B/1/713 |

OTHER PUBLICATIONS

Copy of Search Report for PCT appln. No. PCT/US 00/16694; date search was mailed: Oct. 27, 2000.

*Primary Examiner*—William Trost
*Assistant Examiner*—Marceau Milord

(57) ABSTRACT

The present invention comprises a system for mobile communications. The system comprises a base station (12) having logic for evaluating parameters relating to the quality of individual communication links (14a–17a) between the base station (12) and each of a plurality of mobile units and selecting those parameters that optimize the quality of the communication link (14–17) for each individual mobile unit. The system also comprises circuitry residing in each mobile unit for establishing an optimized communication link (14–17) with the base station (12). In accordance with another aspect of the present invention, a method is disclosed for mobile communications comprising three steps. In step one, parameters representative of transmission quality for individual communication links (14a–17a) between a base station (12) and each of the plurality of mobile units are monitored. In steps two, the parameters for each of the individual communication links (14a–17a) are evaluated to determine the optimum quality for each link. In step three, transmission attributes are selected in response to the evaluated parameters to optimize the transmission quality of each link.

21 Claims, 2 Drawing Sheets

U.S. PATENT DOCUMENTS

| | | | | |
|---|---|---|---|---|
| 5,857,143 | * | 1/1999 | Kataoka | 455/62 |
| 5,867,766 | | 2/1999 | Dinc et al. | 455/62 |
| 5,982,760 | * | 11/1999 | Chen | 370/335 |
| 5,987,033 | | 11/1999 | Boer et al. | 370/445 |
| 5,999,816 | * | 12/1999 | Tiedemann, Jr. et al. | 455/437 |
| 6,021,123 | * | 2/2000 | Mimura | 370/331 |
| 6,023,462 | | 2/2000 | Nieczyporowcz et al. | 370/335 |
| 6,023,621 | * | 2/2000 | Jackson et al. | 455/452 |
| 6,115,407 | | 9/2000 | Gendel et al. | 375/132 |
| 6,128,327 | * | 10/2000 | Bird et al. | 375/132 |

* cited by examiner

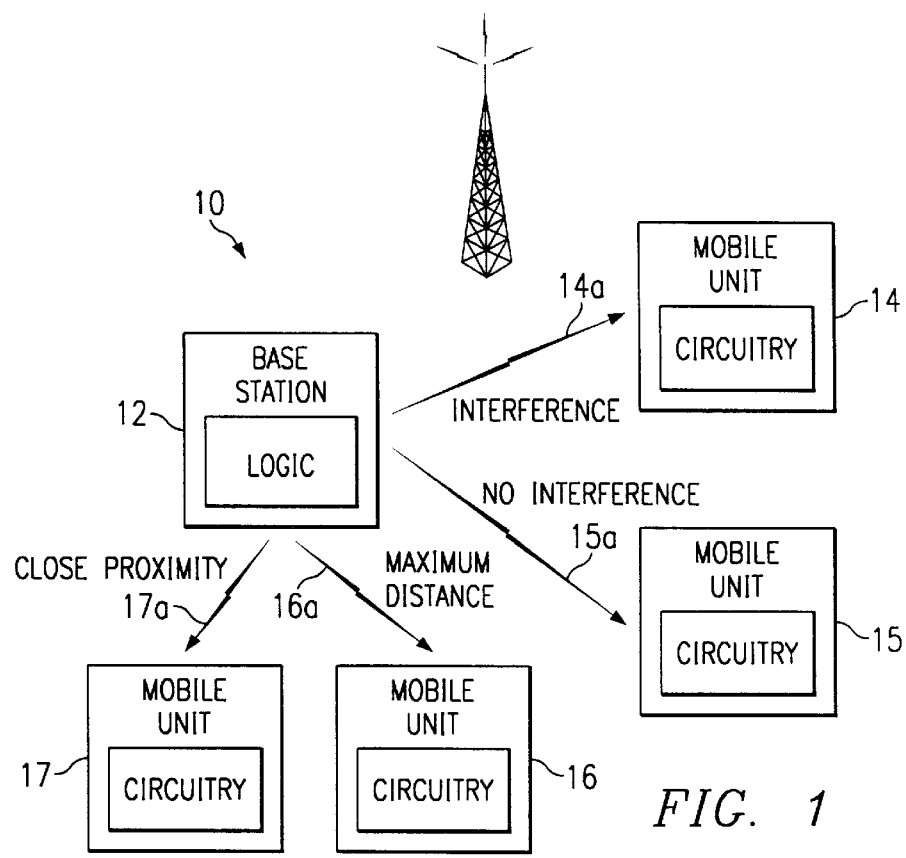
FIG. 1
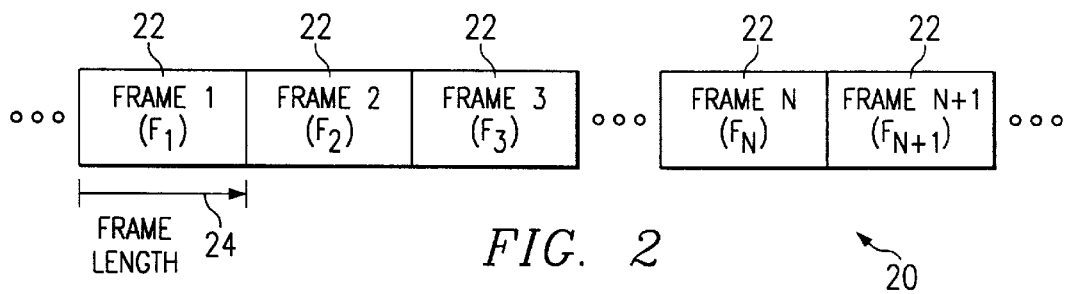
FIG. 2
| SUBSET | 0 | 1 | 2 | 3 | 4 | 5 | 6 | 7 | 8 | 9 | 10 | 11 | 30 |
|---|---|---|---|---|---|---|---|---|---|---|---|---|---|
| CHANNEL | 0...7 | 0...7 | 0...7 | 0...7 | 0...7 | 0...7 | 0...7 | 0...7 | 0...7 | 0...7 | 0...7 | 0...7 | 32 |
| FREQUENCY | 0...7 | 8...15 | 16... | | | | | | | | | ...95 | 34 |
2.4 GHz                   2.4835 GHz
FIG. 3

METHOD AND SYSTEM FOR MOBILE COMMUNICATIONS

TECHNICAL FIELD OF THE INVENTION

This invention relates generally to wireless communications and more particularly to a method and system for mobile communications.

BACKGROUND OF THE INVENTION

In conventional mobile systems there is generally a single base station supporting a plurality of mobile units or hand sets. The base station in such systems acts as the master with all of the mobile units acting as slaves. The master base station controls and selects the transmission attributes for establishing the communication links with each of the mobile units. A function of the base station master controller is to optimize the communication link with the mobile units. It is known to optimize the communication link between the base station and the mobile units by monitoring and evaluating parameters relating to the quality of the transmission characteristics for the entire system. Those parameters that optimize the quality of the communication link for the system are then selected and used whenever the base station communicates with one or more of the mobile units. As each of the mobile units is free to move about the area serviced by the base station, a problem arises when different ones of the mobile units encounter different interference problems affecting the quality of the communication link with the base station controller. In those circumstances, one mobile unit may enjoy a high quality communication link with the base station while another mobile unit may not be able to communicate at all. This problem frustates users and has been a long standing challenge to the developers of mobile communication devices.

Therefore, a need has arisen for a new method and system for mobile communications that overcomes the disadvantages and deficiencies of the prior art.

SUMMARY OF THE INVENTION

In accordance with the present invention, a method and system for mobile communications is disclosed that provides for improved transmission quality for individual communication links between a base station and its mobile units.

In one embodiment of the present invention, a method is disclosed for mobile communications comprising three steps. In step one, parameters representative of transmission quality for individual communication links between a base station and each of the plurality of mobile units are monitored. In step two, the parameters for each of the individual communication links are evaluated to determine the optimum quality of each link. In step three, transmission attributes are selected in response to the evaluated parameters to optimize the transmission quality of each link.

In another embodiment of the present invention, a system for mobile communications is disclosed. The system comprises a base station having logic for evaluating parameters relating to the quality of individual communication links between the base station and each of the plurality of mobile units and selecting those parameters that optimize the quality of the communication link for each individual mobile unit. The system also comprises circuitry residing in each mobile unit for establishing an optimized communication link with the base station.

A technical advantage of the present invention is the ability to evaluate automatically the quality of individual communication links between the base station and a plurality of mobile units. The base station may then select transmission attributes to optimize the transmission quality of each individual communication link.

Other technical advantages should be apparent to one or ordinary skill in the art in view of the specification, drawings, and claims.

BRIEF DESCRIPTION OF THE DRAWINGS

For a more complete understanding of the present invention, the objects and advantages thereof, reference is now made to the following description taken in connection with the accompanying drawings in which:

FIG. 1 is a block diagram of one embodiment of a mobile communication system.

FIG. 2 is a block diagram of one embodiment of frame frequencies used in a frequency hopping mobile communication system.

FIG. 3 is a diagram of one embodiment of subdividing a band used in a frequency hopping mobile communication system.

DETAILED DESCRIPTION OF THE DRAWINGS

Figure 4:
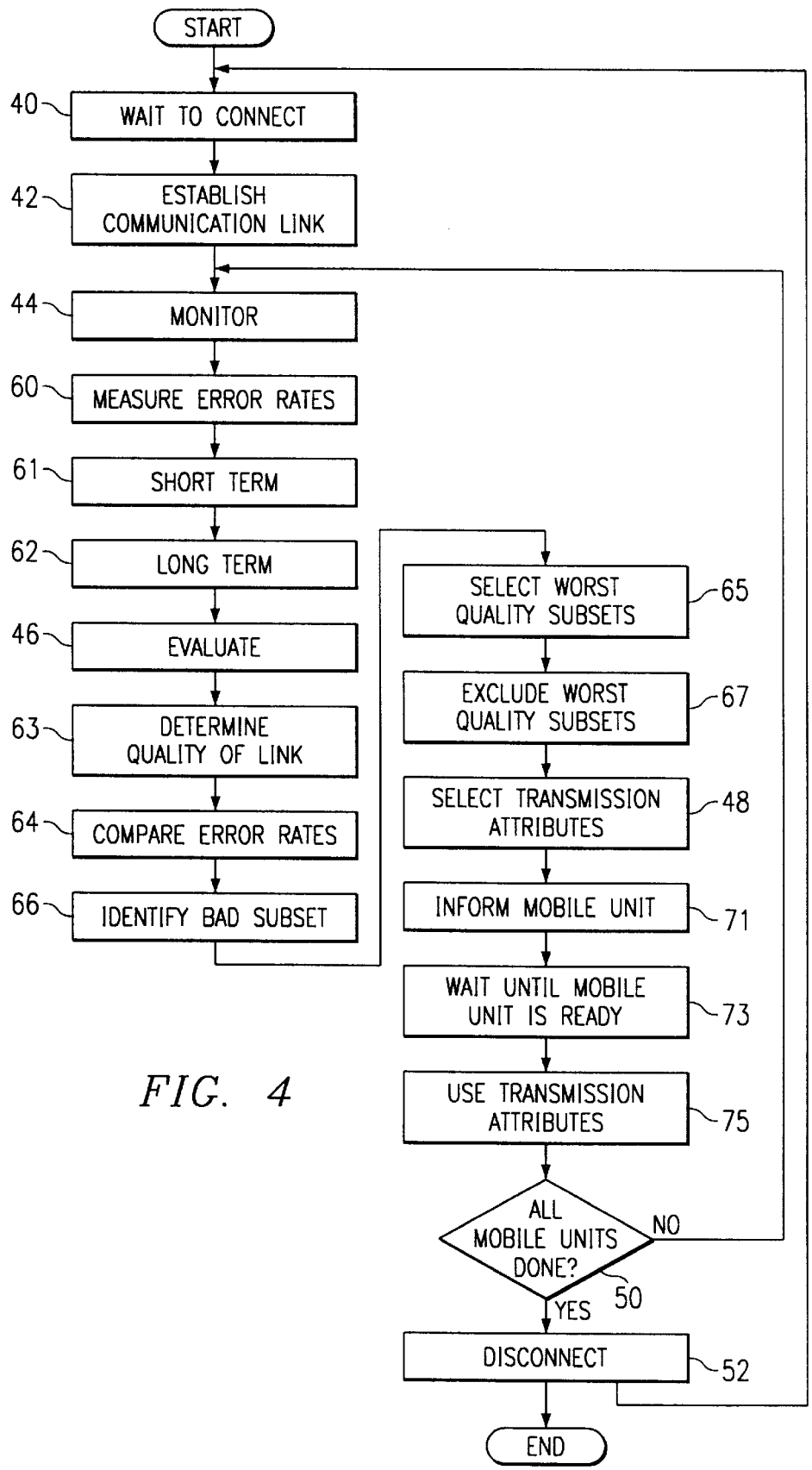
FIG. 4 is a flowchart for a method for mobile communications utilizing the teachings of the present invention.

The preferred embodiment of the present invention and its advantages are best understood by referring to FIGS. 1 through 4 of the drawings, like numerals being used for like and corresponding parts of the various drawings.

FIG. 1 is a block diagram of one embodiment of mobile communication system 10. System 10 comprises a base station 12, and a plurality of mobile units or handsets 14–17. While four mobile units have been shown for illustrative purposes, it should be understood by those skilled in the art that additional mobile units can be added without departing from the spirit of the invention. Each of the plurality of mobile units 14 may be coupled to base station 12 via a corresponding individual communication link 14a–17a to support communication using radio frequencies.

Base station 12 can communicate with mobile units 14–17 using a time division multiplexed (TDM) frame-based communication protocol. For example, each frame can be ten milliseconds (10 ms) in duration and can include transmit and receive channels for communication and control data. One protocol used with digital cordless telephone systems may be the Digital Enhanced Cordless Telecommunications (DECT) protocol, which is the pan-European standard for digital cordless systems and supports up to six mobile units in active communication with base station 12 (i.e., M=6). There are, of course, other protocols used for communicating between base station 12 and mobile units 14–17. For example, the DECT protocol can be modified to support up to four mobile units in active communication with base station 12 (i.e., M=4), each with enhanced communication features due to higher data rates. As another example, a limited number of additional mobile units 14 and 15 may be in active communication with each other but remain in contact with and in sync with base station 12. Further in this embodiment, base station 12 can support up to two mobile units 14 and 15 in active communication with base station 12, where each mobile unit utilizes two individual communication links (e.g., 14a, 14b, 15a, and 15b). It is also within the scope of the invention for system 10 to utilize a base station 12 with a capacity that supports active communication with an additional number of mobile units, or a system with more than one base station 12.

The plurality of mobile units 14–17 can be physically located anywhere within the communication capacity of base station 12, which is generally in a fixed location. Thus, each of the plurality of mobile units 14–17 is subject to different atmospheric or other environment conditions that may affect the quality of the corresponding communication links 14a–17a. FIG. 1 illustrates that link 14a to mobile unit 14 may be encountering interference from a nearby microwave tower that is broadcasting on a similar radio frequency. On the other hand, mobile unit 15, which is also in active communication with base station 12, may not be subject to similar interference because it is out of range of the microwave tower. Mobile unit 15 may also be located in an area where there are no such sources of interfering radio frequencies. As another example, mobile unit 16 may be located at the maximum distance within the range of base station 12. Thus, communication link 16a between base station 12 and mobile unit 16 may be degraded in quality by the weak radio signal strength on link 16a. On the other hand, mobile unit 17 may be located so close to base station 12 that the signal received on communication link 17a by base station 12 from mobile unit 2 is very clear in quality.

To improve the quality over each individual communication link 14a–17a between base station 12 and each of the plurality of mobile units 14–17, base station 12 has logic operable to evaluate parameters relating to the quality of individual communication links 14a–17a. Such parameters may include those that indicate that signal bursts or parts of signal bursts are lost or corrupted over the communication link, or the strength of the signal over the communication link. Other parameters are known to those skilled in the art. Base station 12 may then select parameters that optimize the quality of each individual communication links 14a–17a. Each mobile unit 14–17 has circuitry residing therein for establishing such an optimized communication link with base station 12. Thus, for example, base station 12 is operable to evaluate parameters, such as a set of frequencies, that relate to the quality of link 16a to mobile unit 16, then select those frequencies that optimize the quality of link 16a, and communicate over link 16a to mobile unit 16. Because base station 12 performs such optimization on a link-by-link basis, each mobile unit 14–17 may thus actively communicate with base station 12 on individual sets of frequencies that optimize the quality of the individual links 14a–17a associated with each mobile unit.

Base station 12 is operable to communicate with mobile units 14–17 using radio frequencies, many methods for which are known to those skilled in the art. One such method utilizes spread spectru technology. Two examples of such technology include frequency hopping spread spectrum and direct sequence spread spectrum communications.

Within mobile communication system 10, a frequency hopping scheme can address a number of implementation problems by accomplishing dynamic frequency selection. As one example, frequency hopping is useful in bands such as the ISM (Industrial, Scientific and Medical) band. One advantage of the ISM band is that it is unlicensed, and does not require a license fee for use. Thus, it is used by many vendors for various types of mobile or cordless devices (e.g., medial monitoring devices, wireless LANs, printers, speakers, security systems and in-building mobile communication systems). Consequently, radio frequency interference can be a significant problem when using this band. Use of such ISM-based devices is regulated by and must follow Federal Communications Commission (FCC) guidelines in the United States. For example, devices are allowed to communicate at a particular frequency only with a defined bandwidth for a defined period of time and within a defined signal power level. In the embodiment of FIG. 1, system 10 can use the ISM band extending from 2.4 GHz to 2.4835 GHz for supporting communication between base station 12 and mobile units 14–17. However, in order to operate within FCC or other government regulations, system 10 implements a frequency hopping scheme. This allows system 10 to support robust cordless communications in the ISM band while operating within regulation guidelines.

Under the frequency hopping scheme, base station 12 and mobile units 14–17 generally move in sync in the time domain from frequency to frequency. Mobile units 14–17 are initially not in active communication with base station 12 when entering an area serviced by base station 12. Mobile units 14–17 can then "listen" at a specific radio frequency to attempt to lock on to base station 12. When base station 12 hops to that specific frequency, mobile units 14–17 can identify and receive control data transmitted by base station 12. This allows mobile units 14–17 to lock with base station 12 and sync with the frequency hopping scheme. By implementing such a frequency hopping scheme on an individual basis for each mobile unit, mobile communication system 10 may optimize the individual communication links 14a–17a to each mobile unit 14–17 by avoiding bad channels or frequencies due to radio frequency interference and other problems. Details illustrating such a frequency hopping scheme are discussed in further detail in conjunction with FIGS. 2 and 3.

Such a scheme to optimize individual communication link quality can be used with any algorithm to prevent interference with multiple base stations in system 10. Thus, the scheme should be consistent across any multiple base stations, yet attempt to ensure that adjacent base stations do not select the same frequencies and interfere with one another. This means that the frequency selection process needs to be both predictable (so mobile units can lock with any base station) and variable (so base stations operate at different frequencies). Also, the scheme should avoid selecting frequencies yielding poor quality for individual communications links. Further, the scheme should react to interference by separating the frequencies selected by a base station from possible interference from other base stations.

FIG. 2 is a block diagram of one embodiment of frame frequencies for a frequency hopping mobile communications system. As shown, a frame structure 20 comprises a plurality of frames 22 each having a frame length 24. Each frame 22 follows immediately after the previous frame 22 in the time domain. In the embodiment of FIG. 2, a different frequency ($F_1, F_2, F_3 \ldots F_N, F_{N+1}, \ldots$) is associated with each frame 22 and is used during that frame 22 for communication on a communication link between base station 12 and a mobile unit such as mobile unit 14. This change from frequency to frequency is handled by a frequency hopping scheme implemented by base station 12 and mobile units 14–17. During the duration of a given frame 22, base station 12 and mobile units 14–17 communicate using the selected frequency for that frame 22. When the next frame 22 begins, base station 12 and mobile units 14–17 communicate using a new selected frequency. In one embodiment, frame length 24 is ten milliseconds, thus the frequency being used changes every ten milliseconds. Because mobile unit communication system 10 optimizes the quality for each communication links 14a–17a, base station 12 communicates with each mobile unit utilizing the frequencies that have the best quality available at that time for each communication link. Thus, base station 12 may communicate with each mobile unit 14–17 utilizing a different frequency.

FIG. 3 is a diagram of one embodiment of subdividing the ISM band for a frequency hopping mobile communications system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 3, this range is divided into twelve subsets 30, and each subset 30 is divided into eight channels 32. Each channel 32 is then associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, also needs to implement a scheme for optimizing the quality for each individual communications link. For example, a PCS microwave tower may interfere with frequencies in the ISM band in a particular region. Thus, mobile communication system 10 would not want to use those frequencies in those links so affected. One such method to optimize the quality for an individual communication link is to avoid such bad frequency subsets by blocking their selection from that link. By dividing the ISM band into ninety-six frequencies, the embodiment of FIG. 3 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

Another method to optimize the quality for individual communication links includes changing the carrier used in a direct sequence spread spectrum scheme. Such a scheme may be implemented in the ISM band, for example, by utilizing a bandwidth for each carrier that is at least two megahertz wide. Thus, a direct sequence spread spectrum scheme has available in the ISM band fifty carrier channels. One embodiment for this scheme utilizes a frame length 24, as shown in FIG. 2, of two milliseconds. In such a scheme, frequency hopping is generally not used. Thus, rather than simply communicate using a new selected frequency when the next frame 22 begins, base station 12 must communicate to a mobile unit that it needs to change to a new carrier. One embodiment for such an implementation involves the base station informing a mobile unit that in four frames it will be changing to a selected carrier. Then, after four frames have elapsed, both the mobile unit and base station 12 can communicate using the new carrier.

FIG. 4 is a flowchart of one embodiment of a method for mobile communications in accordance with the present invention. The method of FIG. 4 can be implemented by a base station to optimize the quality of each communication link 14a–17a between base station 12 each mobile unit 14–17. In general, the method of FIG. 4 includes the steps of a base station waiting to connect to a mobile unit, establishing an active communication link with that mobile unit, monitoring that mobile unit, evaluating the communication link to that mobile unit, and selecting parameters that optimize the quality of that communication link. Base station 12 performs the method shown in FIG. 4 for each of the mobile units in communication with base station 12, and until each individual mobile unit has been disconnected from base station 12.

The method of FIG. 4 comprises a number of steps, beginning with step 40. Base station 12 waits in an idle state to connect to a mobile unit such as mobile unit 14. At step 42, base station 12 establishes an individual communication link 14a with mobile unit 14. Base station 12 may utilize an operable radio frequency yielding good quality to communicate with mobile unit 14. When establishing an active communication link 14a between base station 12 and mobile unit 14, a range of such operable radio frequencies should be available for base station 12 to use. Thus, base station 12 may either use a default set of frequencies, or the last frequencies available for the prior active communication link with that mobile unit. As mentioned above with respect to FIG. 3, one embodiment of mobile communication system 10 defines twelve different subsets for grouping channels within the ISM band. One embodiment for the method of FIG. 4 operates to select for use the current best ten out of the twelve available subsets, and to block the remaining two subsets because those subsets represent poor quality for that communication link. Thus, in this embodiment, system 10 may establish the link with the last available ten subsets. In another embodiment, system 10 may establish the link using the last available carrier frequency.

In general, the method of FIG. 4 also includes step 44 for monitoring the individual communication link between base station 12 and that mobile unit. In one embodiment, base station 12 monitors parameters representative of transmission quality for the individual communication link. Such parameters may reveal whether the individual communication link is encountering interference. For example, in one embodiment of system 10, such parameters include two error rates associated with each subset. These error rates are measured in step 60. These error rates reflect conditions encountered on the communication link such as (a) bad packet data, indicated by a bad synchronization word or (b) bad cyclic redundancy code (CRC). The first error rate used in this embodiment is measured over a short period of time, whereas the second error rate is measured over a longer period of time. Consequently, the first error rate can be referred to as the short-term error rate, and the second error rate can be referred to as the long-term error rate. Another parameter that may be measured in step 60 represents the radio signal strength received over the individual communication link from that mobile unit. It is also within the scope of the invention for system 10 to monitor other parameters that may assist in determining the quality of the communication link between base station 23 and that mobile unit.

Base station 12 evaluates the communication link to that mobile unit in step 46. In one embodiment of the invention, evaluating the communication link between base station 12 and the mobile unit involves a number of steps 63, 65, and 67. Step 63 determines the quality of the individual communication link from the parameters. In one embodiment, such determination may be made by performing steps 64 and 66. For example, in step 64 the short-term and long-term error rates for each subset are compared. In this embodiment, the first error rates for each subset are compared and cleared at a short interval (e.g. every five seconds). Both error rates are incremented if the conditions discussed above, including bad packet data and bad cyclic redundancy code, are met. After the error rates are compared in step 64, step 66 includes identifying at least the one subset as a bad subset that should not be used if its error rate is higher than a currently active subset.

After such identification has been performed, the method of FIG. 4 includes step 65 for selecting the two subsets for the communication links that will yield the worst quality. In this embodiment, these subsets will have the highest error rates. Step 67 then excludes these selected subsets from use with the communication link. This step of excluding may be performed by substituting these poor quality subsets for currently active subsets by means of a variety of algorithms. For example, one such algorithm performs such an excluding step if either of the following conditions are met: (a) in a one second period any of the short-term error rates for an active subset has a count that is greater than some predetermined threshold (e.g. nine; or (b) in a five second period any of the long-term error rates for an active subset is greater than that for one of the blocked subsets. Further, in this scheme, every five seconds the error rate for each of the blocked subsets may be reduced by 2.5%. Such a reduction is repeated up to six times until the error rate is equal to 85% of the original value (i.e., 100% minus 6×2.5%=85%).

It is also within the scope of the invention for base station 12 to monitor and evaluate the communication link between the base station and that mobile unit at predetermined intervals. In addition, instead of selecting the two subsets for the communication that will yield the worst quality, the quality of the communication link my be optimized by utilizing an algorithm which selects the best frequencies or carriers to use. System 10 may also additionally monitor and evaluate parameters for all the communication links between base station 12 and all of the mobile units.

The method of FIG. 4 also includes selecting transmission attributes to optimize the transmission quality of the communication link in step 48. In one embodiment, step 48 may comprise three steps 71, 73 and 75. In step 71, base station 12 informs the mobile unit associated with the communication link of the transmission attributes. Such informing may be accomplished in a variety of ways known to those skilled in the art. For example, transmission attributes, such as a new set of blocked subsets representing the worst-quality channels, may be communicated to the mobile unit as data or control parameters. They may also be encoded or passed to the mobile unit as tabular data. Base station 12 then may wait until the mobile unit is ready to utilize the transmission attributes at step 73. Such waiting may be necessary in an embodiment where seamlessness is required to avoid the loss of synchronization between base station 12 and the mobile unit. For example, in a direct sequence spread spectrum system, base station 12 will need to notify the mobile unit that it will be utilizing a new carrier frequency for the communication link. In this embodiment, base station 12 may notify the mobile unit that it will change carrier frequencies after a number of (e.g. four) frames. This gives the mobile unit time to respond and to synchronize with base station 12 on the new carrier frequency. Base station 12 then uses a frequency that utilizes the transmission attributes to communicate with the mobile unit when the mobile unit is ready in step 75.

Steps 40–48 in FIG. 4 are performed for each mobile unit in system 10, as illustrated in step 50. At any time, a mobile unit may disconnect from base station 12 at step 52. At this point, base station 12 then waits to connect to that mobile unit at step 40, but continues the steps of monitoring, evaluating, and selecting for each of the other mobile units in system 10 that is actively communicating with base station 12.

The flowchart of FIG. 4 illustrates one embodiment of a method for mobile communications. Such a method may be implemented in a variety of technologies known to those skilled in the art. For example, various algorithms may be implemented in software firmware or hardware. As another example, methods for evaluating parameters relating to the quality of an individual communication link between the base station and a mobile unit and/or selecting those parameters that optimize the quality of that communication link may be implemented in a table. Furthermore, such algorithms may be changed dynamically to varying conditions encountered by system 10. In this way, system 10 can continue to optimize the quality for individual communication links within system 10.

While the invention has been particularly shown and described by the foregoing detailed description, it will be understood by those skilled in the art that various other changes in form and detail may be made without departing from the spirit and scope of the invention.

What is claimed is:

1. A system for mobile communications, comprising:

a base station having logic operable to evaluate a plurality of parameters relating to the quality of individual communication links between the base station and each of a plurality of mobile units, to determine the quality of each communication link in response to the evaluated parameters, to determine at least one frequency to use for each communication link that optimizes the quality of the communication link, and to select the frequency that optimizes the quality of the communication link for each mobile unit; and circuitry residing in each mobile unit operable to establish an optimized communication link with the base station;

wherein the plurality of parameters includes a long-term error rate and a short-term error rate, and the logic is operable, for a communication link, to determine, using both the long-term error rate and the short-term error rate, a frequency to use that optimizes quality.

2. The system of claim 1, wherein one of the parameters represents a signal amplitude transmitted over the communication link.

3. The system of claim 1, wherein the logic comprises a table operable to select the frequency that optimizes the quality of the communication link.

4. A method for mobile communications, comprising:

monitoring a plurality of parameters representative of transmission quality for individual communication links between a base station and each of a plurality of mobile units;

evaluating the parameters for each of the communication links to determine quality of each communication link, wherein the parameters for each of the communication links includes at least a first parameter relevant to a first time period and a second parameter relevant to a second time period of different duration from the first time period;

determining, based on both the first and second parameters, at least one frequency to use for each communication link that optimizes the quality of the communication link; and selecting the at least one frequency that optimizes the quality of the communication link.

5. The method of claim 4, wherein the monitoring comprises measuring error statistics for a plurality of frequencies usable for each communication link, and the first and second parameters include measured error statistics.

6. The method of claim 4, wherein monitoring comprises determining whether an communication link is encountering interference.

7. The method of claim 4, further comprising monitoring and evaluating the parameters at predetermined intervals.

8. The method of claim 4, wherein the evaluating and determining comprise:

determining the quality of each communication link from the parameters;

selecting at least one frequency for each communication link that will yield the worst quality; and excluding the selected frequency from use with the communication link.

9. The method of claim 8, wherein the evaluating and the determining the at least one frequency comprise:

comparing error rates for a plurality of frequencies usable for each communication link; and identifying at least one of the plurality of frequencies as having poor quality when its error rate is higher than another of the plurality of frequencies.

10. The method of claim 4, wherein the selecting comprises:

informing the mobile unit associated with the communication link of the selected frequency;

waiting until the mobile unit is ready to utilize the selected frequency; and using the selected frequency to communicate with the mobile unit associated with the communication link when the mobile unit is ready.

11. A method for mobile communications, comprising:

providing a base station and a plurality of associated mobile units;

establishing a communication link between the base station and a selected mobile unit:

evaluating the communication link between the base station and the selected mobile unit to determine transmission quality including evaluating at least a first error parameter that is relevant to a first time scale and a second error parameter that is relevant to a second time scale;

selecting a frequency to use for the communication link based on both the first error parameter and the second error parameter; and repeating the process for another mobile unit.

12. The method of claim 11, further comprising monitoring the transmission parameters for the communication links between the base station and the plurality of mobile units.

13. The method of claim 11, further comprising monitoring whether any signal source is interfering with the communication link between the base station and the selected mobile unit.

14. The method of claim 11, further comprising communicating to the selected mobile unit the selected frequency to use for the communication link.

15. A system for mobile communications, comprising:

a plurality of mobile units; and a base station that communicates with the mobile units, the base station comprising logic configured to evaluate a plurality of parameters relating to quality of individual communication links between the base station and each mobile unit, and configured to determine, based on the plurality of parameters, at least one frequency to use for each communication link;

wherein the plurality of parameters includes, for each communication link, at least a first parameter relevant to a first time scale and a second parameter relevant to a second time scale that differs from the first time scale, and the logic is configured to, for a communication link, determine, given both the first and second parameters, a frequency to use based on at least one of the first and second parameters.

16. The system of claim 15, wherein the system configured to use frequency hopping, and the logic is configured to identify, based on the plurality of parameters, at least one subset of frequencies that would provide poor quality for a communication link and to block the at least one subset of frequencies from use on that communication link.

17. The system of claim 15, wherein the logic is configured to identify, based on the plurality of parameters, an active subset of frequencies as providing poor quality and to substitute a blocked subset of frequencies with the active subset of frequencies.

18. The system of claim 17, wherein the plurality of parameters includes, for each of multiple subsets of frequencies for each individual communication link, the first parameter and the second parameter, and wherein the logic is configured to identify the active subset of frequencies as providing poor quality if the second parameter for the active subset compares unfavorably to the second parameter for the blocked subset.

19. The system of claim 18, wherein the logic is further configured to identify the active subset of frequencies as providing poor quality if either the first parameter for the active subset exceeds a predetermined threshold or the second parameter for the active subset compares unfavorably to the second parameter for the blocked subset.

20. The system of claim 15, wherein the system is a direct sequence spread spectrum mobile communication system, and the logic is configured to select high quality carrier frequencies to use for the communication links.

21. The system of claim 15, wherein the first and second parameters relate respectively to errors relevant to the first time scale and errors relevant to the second time scale, and errors comprise bad packet data or bad cyclic redundancy code.

* * * * *